(12) United States Patent
Senese et al.

(10) Patent No.: US 8,724,812 B2
(45) Date of Patent: May 13, 2014

(54) METHODS FOR ESTABLISHING A SECURE POINT-TO-POINT CALL ON A TRUNKED NETWORK

(75) Inventors: Thomas J. Senese, Schaumburg, IL (US); Adam C. Lewis, Buffalo Grove, IL (US); Anthony R. Metke, Naperville, IL (US); George Popovich, Palatine, IL (US); Shanthi E. Thomas, Carpentersville, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 216 days.

(21) Appl. No.: 12/983,067

(22) Filed: Dec. 31, 2010

(65) Prior Publication Data

US 2012/0170743 A1 Jul. 5, 2012

(51) Int. Cl.
 *H04L 9/08* (2006.01)

(52) U.S. Cl.
 USPC .......................... 380/259; 713/156; 713/175

(58) Field of Classification Search
 USPC .................................. 380/259; 713/156, 175
 See application file for complete search history.

(56) References Cited

U.S. PATENT DOCUMENTS

| | | | | |
|---|---|---|---|---|
| 6,141,533 A * | 10/2000 | Wilson et al. | ................. | 455/11.1 |
| 6,144,949 A * | 11/2000 | Harris | ............................. | 705/38 |
| 6,148,405 A | 11/2000 | Liao et al. | | |
| 6,711,263 B1 * | 3/2004 | Nordenstam et al. | ......... | 380/282 |
| 7,506,370 B2 | 3/2009 | Aggarwal | | |
| 7,697,692 B2 * | 4/2010 | Takata et al. | .................. | 380/277 |
| 2004/0054891 A1 * | 3/2004 | Hengeveld et al. | ........... | 713/163 |
| 2004/0083363 A1 * | 4/2004 | Hengeveld et al. | ........... | 713/163 |
| 2004/0179502 A1 * | 9/2004 | Naghian et al. | ................ | 370/338 |
| 2004/0210756 A1 * | 10/2004 | Mowers et al. | ................ | 713/168 |
| 2005/0010757 A1 * | 1/2005 | Bosler | ............................ | 713/156 |
| 2005/0076198 A1 * | 4/2005 | Skomra et al. | ................. | 713/156 |
| 2005/0076216 A1 * | 4/2005 | Nyberg | .......................... | 713/171 |
| 2009/0024845 A1 | 1/2009 | Benshetler et al. | | |
| 2009/0034736 A1 | 2/2009 | French | | |
| 2010/0040233 A1 * | 2/2010 | Ganapathy | ..................... | 380/277 |
| 2010/0100953 A1 * | 4/2010 | Mowers et al. | .................. | 726/10 |
| 2011/0010770 A1 * | 1/2011 | Smith et al. | ...................... | 726/18 |
| 2011/0093710 A1 * | 4/2011 | Galvin et al. | .................. | 713/169 |
| 2011/0202755 A1 * | 8/2011 | Orsini et al. | ................... | 713/151 |
| 2012/0084368 A1 * | 4/2012 | Go et al. | ........................ | 709/206 |

FOREIGN PATENT DOCUMENTS

| | | |
|---|---|---|
| EP | 1763192 A1 | 3/2007 |
| WO | 2009089908 A1 | 7/2009 |

OTHER PUBLICATIONS

PCT International Search Report Dated Apr. 18, 2012 for Counterpart Application PCT/US2011/067714.

* cited by examiner

*Primary Examiner* — Techane Gergiso
(74) *Attorney, Agent, or Firm* — Valerie M. Davis; Kenneth A. Haas (57) ABSTRACT

Methods for establishing secure point-to-point communications in a trunked radio system include receiving, at a trunking controller, a request from a source endpoint for a traffic channel for confidential communications between the source endpoint and a destination endpoint using a shared unique first symmetric key. The trunking controller provides keying material related to the symmetric key over the secured control channel to at least one of the source or destination endpoints and assigns a traffic channel. Moreover, in response to the request, the controller assigns a traffic channel. The keying material enables the unique first symmetric key to be securely established between the source and destination endpoints.

7 Claims, 6 Drawing Sheets

METHODS FOR ESTABLISHING A SECURE POINT-TO-POINT CALL ON A TRUNKED NETWORK

TECHNICAL FIELD

The present disclosure relates generally to communication systems and in particular to methods for establishing a secure point-to-point call on a trunked network.

BACKGROUND

Efficient, reliable, and real-time communication with minimal latency is a critical requirement for public safety organizations and first responders. Inasmuch, the Telecommunications Industry Association (TIA) adopted and standardized a suite of Land Mobile Radio (LMR) standards termed Project 25 (P25), as described for example, in the TIA 102-series documents. The emerging P25 standard defines the operation and interfaces of P25-compliant radio systems. Specifically, and in part, the P25 standard defines a standard for trunked systems.

A "trunked system" or "trunked network" is defined as a radio system where a limited number of frequencies or "traffic channels" are shared among a large group of endpoints (wherein "endpoints" are also interchangeably referred to herein as users), and the traffic channels are dynamically assigned as needed using a control channel. This is in contrast to a "conventional" communication system, which typically uses a dedicated channel for each group of endpoints. Trunked systems are particularly beneficial in specific instances where there is a limited number of available communication frequencies, but a large group of endpoints use the system for communications. Each group of endpoints within a trunked system is assigned to a virtual channel or "talkgroup" having a group identification (group ID) where, inherently within a trunked system, the number of talkgroups usually exceeds the number of available communication frequencies. Often, upon assignment of a group ID, large numbers of endpoints are assigned to that talk group ID, and all endpoints communicate through the use of "shared" keys.

Many law enforcement agencies, fire departments, and other public safety organizations currently use shared keys provided by trunked systems to relay critical voice communications. To provide the best level of confidentiality protection, each pair of endpoints ideally shares their own unique key, with the key being "unique" in that it is different from the key shared by any other pair of endpoints in the communication system. However, in systems where there are hundreds, thousands, or tens of thousands of endpoints, it is not practical to manage unique keys for every possible point-to-point communication pair. As a result, radio system administrators typically configure the radio endpoints to use a common group key for secure, point-to-point calls. The common group key thus ensures that each device has the appropriate key when communicating with a different device. However, the disadvantage is that the confidentiality of the communication session is not protected from all other endpoints in the system that possess the same group key; and one or more of these other endpoints may inappropriately intercept communications between the established point-to-point communication pair.

Accordingly, there is a need for methods for establishing secured point-to-point communications on a trunked network.

BRIEF DESCRIPTION OF THE FIGURES

The accompanying figures, where like reference numerals refer to identical or functionally similar elements throughout the separate views, together with the detailed description below, are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides methods for establishing secure point-to-point communications on a trunked radio system. Accordingly, methods for establishing secure point-to-point communications include a controller in a trunked radio system receiving a request, from a source endpoint, for a traffic channel for secure communications between the source endpoint and a destination endpoint, wherein a first unique symmetric key that is shared between the source and destination endpoints is used for the secure communications. The source endpoint sends the request for the traffic channel over a secure control channel. In response to the request for the traffic channel, the controller provides keying material related to the unique first symmetric key, over the secure control channel, to the source endpoint, the destination endpoint, or both. Moreover, in response to the request, the controller assigns a traffic channel. The keying material enables the unique first symmetric key to be securely established between the source and destination endpoints.

In another embodiment, the destination endpoint and the source endpoint each receive from the controller the encrypted unique first symmetric key over the control channel. The encrypted unique first symmetric key, in another embodiment, is provided by the controller to the source and destination endpoints over the traffic channel. In one further embodiment, the controller generates the unique symmetric key and provides the unique symmetric key as the keying material to both the source and destination endpoints over the secure control channel. The controller in yet another embodiment provides the encrypted unique first symmetric key and a ticket to the destination endpoint over the secure control channel.

At times, as described herein, the terms "trunked network", "trunked system", and "trunked radio system" are used interchangeably. Illustrative embodiments of the present disclosure, as described below, are applicable to any type of subscriber on the trunked network, such as, among others, receive only pagers and P25 trunked pagers. Further, certain advantages of the methods, as described herein, are beneficial to any type of trunked subscriber on the trunked network. The terms "private call" and "point-to-point call" are used interchangeably and mean a call or media session between two subscriber endpoints. A call between a subscriber and a console is referred to as a "unit-to-unit" call. However, in general, the teachings herein are applicable to securely establishing a unique symmetric key between two endpoints, regardless of the particular types of endpoints involved.

For purposes of this disclosure and appended claims, as described herein, the term "endpoint" and "subscriber" are each used interchangeably and are each defined as a device that sources a media transmission (such as voice, data, etc.) in a trunked system, i.e., a source endpoint, or a device that is the target end recipient of the media transmission in the trunked system, i.e., the destination endpoint. By contrast, a controller is defined as an intermediary device (as opposed to the source or destination of the media transmission) within the infrastructure of the trunked system, which facilitates the distribution of keying material to source and destination endpoints to enable secure point-to-point communications between those endpoints.

In the context of a trunked network, a "control channel" is defined as a control resource that performs resource allocation and acts as a digital communication message bearer and handler between the RFSS (RF Sub-System) and the SU (Subscriber Unit). A control channel (or communications on the control channel or any other channel and its communications) is defined as being "secure" when the channel and/or its communications provide some level of assurance that the communications on the channel are secret from subscribers not having the required access or special data to access and read the communications. Hence a control channel can be secured through use of keys (e.g., for encryption) or any other means such as by physical connections. A "traffic channel" is defined as a channel used for voice or data communications. The terms "traffic channel", "bearer channel" and "voice channel" are used interchangeably in this disclosure and appended claims and are defined as the dynamically assigned radio frequency resources over which subscriber traffic or media is sent. As used herein, "confidential communications" refers to any encrypted radio communication transmitted over a traffic channel, as well as any encrypted communication transmitted over a control channel.

The endpoints are also commonly referred to in the art as communication devices, subscribers, user equipment (UE), access devices, access terminals, mobile stations, mobile subscriber units, mobile devices, user devices, and the like. The endpoints can be any type of communication device such as radios, mobile phones, mobile data terminals, Personal Digital Assistants (PDAs), laptops, two-way radios, cell phones, etc. The controller can be, for instance, any suitable network device within the infrastructure of the trunked network.

The subscribers can be members of a group or talk group that includes a combination of preconfigured users, ad hoc users or members. Alternatively, subscribers may not be members of such groups. As described herein, a communication group in a trunking system that communicates voice as media over a traffic channel is referred to as a "talkgroup" or "group". A trunking system features a plurality of talkgroups where it is possible for a subscriber to be a member of any combination of talkgroups. Illustratively, an endpoint assigned to an ambulance may be a member of a Fire & Rescue talkgroup as well as a Law Enforcement talkgroup. Each subscriber engages in a communication session by way of any combination of hardware and software and/or firmware.

As used herein, the terms "encrypting" and "encryption" refer to the use of an algorithm to process voice, data, or other information to make it unreadable, except to those having the necessary information, such as a key, to decrypt the data. The term "validating" in this specification and appended claims is defined as a verification that encrypted data and/or keying material comes from a trusted source.

A "symmetric key" or "symmetric key encryption" is defined in this disclosure and appended claims to describe a cryptographic system that uses the same key for encryption and decryption of data. Alternatively, as used herein, an "asymmetric key" or "asymmetric key encryption" is used to describe a cryptographic system that uses both a public and a private key. In symmetric key encryption, the secret key is known by a user performing the encrypting of the data as well as by a user decrypting the data. In asymmetric key encryption, the public key is used to encrypt the data, and the data is decrypted with the private key.

A "public key" is freely distributed and used for encryption; however, a private key is often used to decrypt data that has been encrypted with a public key, for example as in asymmetric key encryption. As used herein, a "public key certificate" is an electronic document employing a digital signature which binds a public key to an identity. In some embodiments, such an identity includes, for example, a name, an address, or other personally identifying information. Moreover, the public key certificate (also referred to as a digital certificate or certificate) is used for confirmation that a public key belongs to a specific entity.

As used herein, a "ticket" or "Kerberos ticket" is used to describe a information that is issued by an authentication server. The information is encrypted using the authentication server key. Moreover, as discussed in greater detail below, the phrase "keying material related to the symmetric key" is defined in some embodiments as a unique symmetric key; while in other embodiments the phrase "keying material related to the symmetric key" is defined as the material or information that is used to encrypt the unique symmetric key; and in yet further embodiments the phrase "keying material related to the symmetric key" is defined as the material or information that is used to generate the unique symmetric key.

In at least one embodiment, the keying material comprises a public key of a source endpoint. As used herein, the term "keying material" refers to anything used, for example, in the encryption and/or decryption of data or other information, such as, a public key, a private key, a symmetric key, an asymmetric key, a nonce, or a ticket, among others. As such, the keying material is provided by the controller to a destination endpoint for use in encrypting the unique symmetric key to thus yield a resulting encrypted unique symmetric key.

Further, as defined in this specification and appended claims, a "nonce" is a number that is added to a message by a sender, wherein any specific value of the nonce is used only once by a sender. When the recipient of the messages copies the nonce into the reply back to the sender, the sender can be assured that the response is in reply to the current request and not an early request. In other words, it is used to prevent replay attacks. An authentication token can be a shared symmetric key or the public key of one of the subscribers. A repository is defined as a server that stores certificates and makes them available to appropriate (Public Key Infrastructure (PKI) participants. PKI is a concept that includes Certificate Authorities (CAs) and Registration Authorities (RAs) that control issuance, renewal, and revocation of digital certificates.

Message Authentication Data (MAD) is defined as data that is used to authenticate the originator of a message, or data that is used to determine whether a message has been modified in transit between the sender and receiver, which is commonly known as message integrity. Two methods are well known that provide such functionality: the use of a Message Authentication Code (MAC) which is calculated with a symmetric key, and a digital signature calculated with an asymmetric key; thus, as used herein, the term MAD generically means any data used to accomplish message originator authentication or message integrity.

As described in this disclosure, the systems and methods for establishing point-to-point communications on a trunked network are compatible with established standards and protocols for radio communications, for example, as is described in the TIA 102 series documents. Specifically, the TIA 102 documents include a description of radio communication over a Common Air Interface (CAI) as described, for example, in TIA-102.BAAA published January 1996 by the TIA and any subsequent revisions. The CAI defines a standard for radio-to-radio communication. In particular, using the CAI, any P25-compatible radio can communicate with any other P25-compatible radio. P25 uses a vocoder to convert speech into a digital format for transmission over a radio channel using a standard CAI packet structure for traffic and signaling.

Accordingly, P25 signaling is used and may in some instances be modified to carry certain information or data for the purpose of implementing embodiments of the present teachings described with respect to FIGS. 3-6. However, the use of P25 signaling is illustrative and not meant to limit the teachings herein. Therefore, in alternative embodiments, any suitable signaling could be used to carry out the present teachings including signaling described in other standards documents or proprietary signaling.

In various embodiments as described herein, a trunked network includes a radio frequency sub-system having a trunking controller (also referred to herein interchangeably as "a controller") used for enabling aspects of the current disclosure. Thus, on occasion, the terms "RFSS" and "trunking controller" or "controller" are used interchangeably herein without a loss of clarity, and in general refer to any type of trunking controller, regardless of the name of which it is called. Additionally, the RFSS communicates with a "fixed station" such as at least one base station.

The trunking controller identifies a communication group and transmits the voice traffic among various endpoints on an assigned voice channel. In addition to transmitting the voice traffic on corresponding voice channels, the trunking controller provides voice channel assignments to various source and destination endpoints within a communication group. In at least one method of the present disclosure, the trunking controller establishes secured point-to-point communications between source and destination endpoints over an assigned traffic channel.

In some embodiments, the base station communicates directly to a subscriber or other UE to relay voice traffic and control channel data from the trunking controller within the RFSS. Alternatively, the base station communicates with the subscribers through a repeater. The repeater is used to extend network coverage by providing wireless CAI communication between base stations as well as between a base station and the subscriber or other mobile device.

Illustratively, a base station of a trunking controller is connected to the RFSS by either an analog fixed station interface (AFSI) or a digital fixed station interface (DFSI). Embodiments of the present disclosure that incorporate various aspects of the trunked network advantageously utilize standard IP protocols. Such IP protocols include user datagram protocol (UDP)/internet protocol (IP) connections as described in IETF RFC 768 dated August 1980 and any subsequent revisions, and as described in IETF RFC 791 dated September 1981 and any subsequent revisions, as well as real-time transport protocol (RTP), as described, for example, in Request for Comments (RFC) 3550 dated July 2003 by Internet Engineering Task Force (IETF) and any subsequent revisions.

While embodiments of the present disclosure employ various teachings of the aforementioned standards and protocols, the embodiments as described herein are not limited by these protocols. Those skilled in the art will realize that the above recognized advantages and other advantages described herein are merely illustrative and are not meant to be a complete rendering of all of the advantages of the various embodiments.

Figure 1:
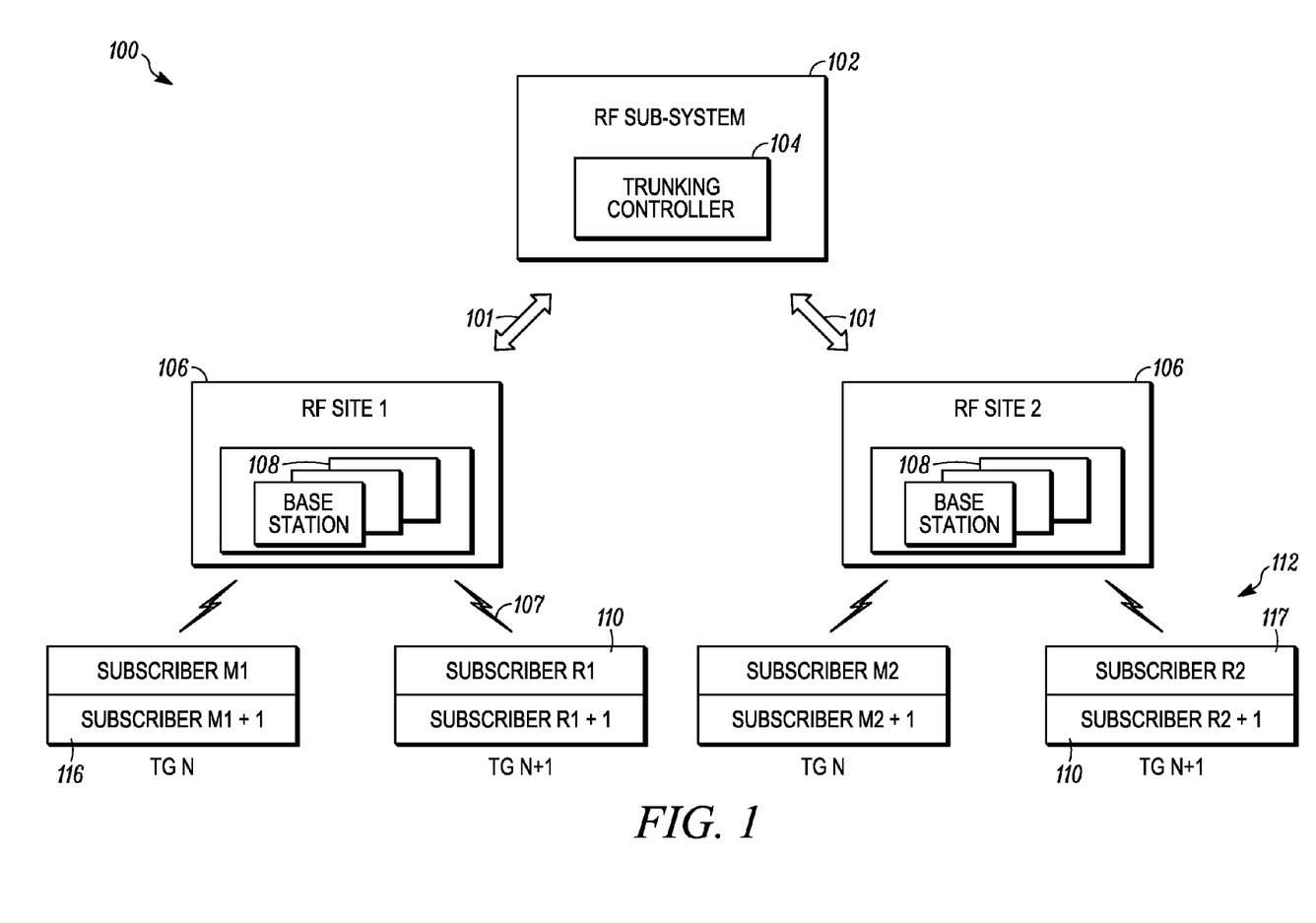
FIG. 1 is a system diagram illustrating a trunked network in accordance with embodiments of the present disclosure featuring secured point-to-point communications within a talk group.

Referring now to the figures, FIG. 1 illustrates a trunked radio system 100. The trunked radio system 100 provides a general depiction of a physical implementation of various embodiments of the present disclosure. Specifically, the illustrative trunked radio system 100 is designed for implementation of various methods of establishing secure point-to-point communications on the trunked radio system 100, for example, by reference to FIGS. 2-6.

The trunked radio system 100 includes a plurality of subscriber units (e.g., M1, M1+1, M2, and M2+1 (of a talkgroup (TG) N) and R1, R1+1, R2, and R2+1 (of a talkgroup N+1)), which communicate with each other using one or more base stations 108 located at radio frequency (RF) sites 1 and 2 (106). A Radio Frequency Sub-system (hereinafter "RFSS") 102 and the subscribers perform methods for establishing secure point-to-point communications in the trunked radio system 100, in accordance with the teachings herein.

As shown in FIG. 1, the RFSS 102 is in communication with the plurality of radio frequency site systems 106 as indicated, for instance, by arrow 101. The interface between the radio frequency site systems 106 and the RFSS 102 may be either wired or wireless. The RFSS 102 includes a trunking controller 104, which is described further below.

Each radio frequency site system 106 includes a number of infrastructure devices including, among others, a control station (not shown), a plurality of base stations 108, and corresponding relay (not shown) that collectively provide communication services to a plurality of subscribing talk groups 112 (e.g., TG N and TG N+1) within a predetermined geographical coverage region for the RF site 106. At each radio frequency site system 106, each base station from the plurality of base stations 108 wirelessly communicates with the RFSS 102. Moreover, in one illustrative implementation, each base station 108 is configured or adapted to wirelessly communicate (e.g., as indicated by links 107) with one or more subscribers or "endpoints" from a plurality of subscribers 110 within the plurality of talkgroups 112. Alternatively, the interface between the base stations and the subscribers can be wired. Illustratively shown in FIG. 1, in terms of public safety, a base station 108 is assigned to talk group N, among others, such that the base station 108 wirelessly communicates with Subscriber M1 at Radio Frequency Site 106 RF Site No. 1 as well as Subscriber M2 at Radio Frequency Site 106 RF Site No. 2.

Devices in the trunked network 100, including the RFSS 102 elements, the radio frequency sites 106, the subscribers and other well known infrastructure devices (not shown) in the trunked network 100, generally include a memory, one or more network interfaces, and a processing device or processor (although not shown) that are operatively coupled, and which when programmed form the means for the device to implement its functionality, for example, as illustrated by reference to the methods and diagrams shown in FIGS. 2-6.

The network interfaces are used for passing signaling, also referred to herein as messaging, (e.g., messages, packets, datagrams, frames, superframes, or any other information blocks) between the elements of the system 100. The implementation of the network interfaces in a given device depends on the particular type of network, i.e., wired and/or wireless, to which the device is connected. For example, where the network supports wired communications, the interfaces may comprise a serial port interface (e.g., compliant to the RS-232 standard), a parallel port interface, an Ethernet interface, a USB interface, and/or a FireWire interface, and other well known interfaces.

Where the network supports wireless communications, the interfaces comprise elements including processing, modulating, and transceiver elements that are operable in accordance with any one or more standard or proprietary wireless over-the-air interfaces, wherein some of the functionality of the processing, modulating, and transceiver elements may be performed by means of the processing device through programmed logic such as software applications or firmware stored on the memory device of the system element or through hardware.

In addition to the above-mentioned functionality, implemented via programmed logic or code, the processor of a given device may be further programmed with software or firmware logic or code for performing signaling and functionality to facilitate methods in accordance with the teachings disclosed herein, such as, among others, methods described by reference to FIGS. 2-6. Furthermore, the processing device may be implemented on hardware, for example, as a state machine or an application specific integrated circuit, "ASIC" to perform such functionality. The memory in a device includes any readily recognizable combination of short-term and long-term storage of software or firmware for programming the processing device with the logic or code needed to perform its functionality and for storage of various data needed for the functioning of the device and its intended functionality.

Turning now to a description of the various elements shown in FIG. 1, as mentioned above, the plurality of talkgroups 112 includes a talkgroup N and a talkgroup N+1. As illustratively shown, the talkgroup N includes the subscriber M1 and the subscriber M1+1 each communicatively coupled to the radio frequency site system 106 RF Site 1 as well as the subscriber M2 and the subscriber M2+1 communicatively coupled to the radio frequency site system 106 RF Site 2. Similarly, the talkgroup N+1 includes the subscriber R1 and the subscriber R1+1 each communicatively coupled to the radio frequency site system 106 RF Site 1 as well as the subscriber R2 and the subscriber R2+1 communicatively coupled to the radio frequency site system 106 RF Site 2. In some embodiments, each of the plurality of talkgroups 112 is preconfigured with specified subscribers. Moreover, in some embodiments, participants within at least one talk group from the plurality of talkgroups 112 are dynamically determined based on one or more factors including, but not limited to, a user's affiliation. In one example, one or more devices used by a medical rescue participant are elected, ad hoc, as part of both a law enforcement talkgroup as well as a fire talkgroup in response to an emergency situation at the scene of a motor vehicle accident.

In a conventional or "non-trunked" system, users control access of their subscribers to traffic or voice channels by directly selecting a frequency or channel. However, inherent to the trunked network 100, the trunking controller 104 manages system operation. In particular, the trunking controller 104 signals the subscribers 110 by way of an outbound signaling packet (hereinafter "OSP"). Such system operation in the trunked network 100 includes, for example, granting subscriber access to traffic channels and signaling subscribers over a control channel.

A control channel, as used herein, is defined as a channel used by the controller to coordinate communications for the subscribers within the talkgroups, for example, through traffic channel assignments for all or some of the subscribers in the talkgroups. In some embodiments, the control channel comprises a dedicated or "primary" control channel. Alternatively, the control channel may comprise a composite control channel, where the composite control channel can act as a traffic channel when no other traffic channels are available often due to congestion. In other embodiments, a secondary control channel is provided. The secondary control channel is used, for example, when the dedicated control channel is not available.

When any endpoint in the trunked network 100 is initially powered on or when a previously activated endpoint enters a new area serviced by a different radio frequency site 106, the endpoint registers with the RFSS 102. Registration is a process by which the trunked network 100 ensures that only authorized subscribers 110 have access to the trunked network 100. In addition, registration can be used to track a subscriber's physical location within the network coverage area of a radio frequency site 106 of the trunked network 100.

Upon powering up, each subscriber 110 receives an assigned active control channel via an OSP periodically sent by the trunking controller 104. Accordingly, each subscriber 110 scans from a list of control channels to find the active control channel for the trunked system 100. The subscribers 110 listen on the active control channel for a voice channel assignment that corresponds to a designated talkgroup from the plurality of talk groups 112. The trunking controller 104 is able to distinguish each subscriber according to an authentication certificate and with a public key assigned to that particular subscriber. The OSP, as directed by the trunking controller 104, periodically provides the voice channel assignment to the subscribers 110. In some embodiments, all of the plurality of talkgroups 112 are assigned to the same voice channel. Alternatively, each of the plurality of talkgroups 112 may be assigned to a different voice channel. Also, a subset of the plurality of talkgroups 112 can share a voice channel.

Specifically, to establish secure point-to-point communications in a trunked radio system, the trunking controller 104 receives, over a secure control channel, a request for a designated traffic channel for confidential communications between a source endpoint and a destination endpoint. Illustratively, as shown in FIG. 1, a source endpoint 116 comprises a subscriber M1+1 of talk group N that requests a designated traffic channel from the RFSS 102 to engage in confidential communications with a destination endpoint 117 comprising a subscriber R2 of talk group N+1. Confidential communications are achieved between the source endpoint 116 and the destination endpoint 117 using a unique first symmetric key shared between the source and destination endpoints. The present disclosure describes techniques of securely transporting the first symmetric key only to endpoints 116 and 117 within the talkgroups 112 so that the two endpoints can securely communicate, without access by the other members of the talkgroups 112 to those communications.

Figure 2:
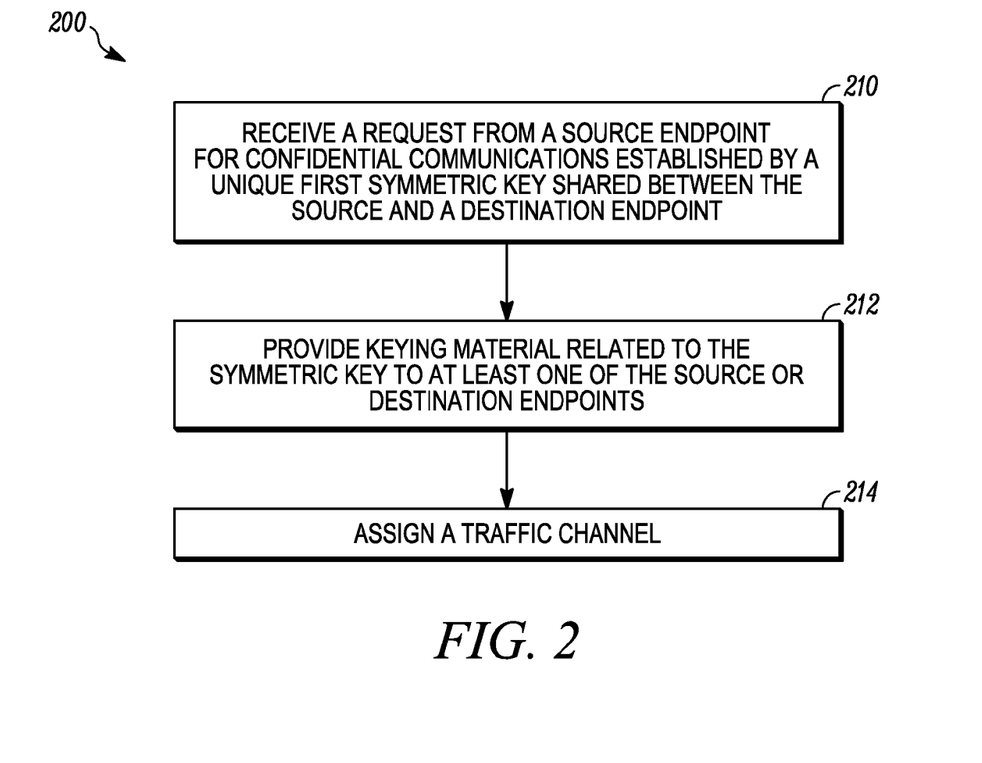
FIG. 2 is a logical flowchart showing an illustrative method for establishing secured point-to-point communications in a trunked network in accordance with various embodiments.

Referring now to FIG. 2, a method 200 for establishing secure point-to-point communications in a trunked radio network in accordance with some embodiments is illustrated. With direct correspondence to the trunked network 100 of FIG. 1, FIG. 2 is a general flow chart illustrating general operations shared by all of the embodiments discussed with respect to FIGS. 3-6. With specific reference to FIG. 1, the operations illustrated in FIG. 2 are functionally executed by the trunking controller 104 on a source subscriber or "endpoint" and a destination subscriber or "endpoint" within one of a plurality of talkgroups 112 associated with the trunking controller 104. Such functionality, as well as the functionality illustrated by way of the remaining FIGS. 3-6, is performed using the combination of a processing device, memory, and interface coupled together and adapted, such as through software, firmware, or hardware programming, to perform such functionality.

In accordance with method 200 and the accompanying diagrams in FIGS. 3-6, the present disclosure describes methods to establish secure two way private calls in a system, such as a Land Mobile Radio (LMR) system. More particularly, the embodiments described herein provide a means of establishing a unique symmetric key (i.e., a shared secret) at each of two subscriber endpoints as part of call setup, wherein the unique symmetric key is used in these embodiments as a traffic encryption key for traffic sent over an assigned traffic channel. Some of the embodiments rely on public key cryptography, and all of the embodiments make use of an RF subsystem (RFSS) to provide for the novel functionality, which results in more efficient use of wireless bandwidth.

Generally speaking, the RFSS performs tasks including, but not limited to, looking up certificates and/or public keys of endpoints of the parties to the call. Additionally the RFSS can validate certificates of the endpoints before sending associated public keys to the endpoints. Shown in FIGS. 3-6 are four alternative embodiments for providing the functionality as generally described by reference to method 200 of FIG. 2. The examples in each embodiment illustrate a point-to-point call setup between two subscribers. However, the four embodiments can also extend to a unit-to-unit call setup between a subscriber and a console, and also to a Telephone Interconnect Call between a subscriber and an interconnect gateway, for instance.

Turning again to method 200, at 210, the trunking controller 104 within a trunked radio system 100 receives a request from a source endpoint for a traffic channel that will be used for confidential communications between the source endpoint and a destination endpoint. The confidential communications are established, in part, using a unique first symmetric key shared between the source and destination endpoints that will be established at the source and destination endpoints using the present teachings, wherein "established" means transported to the endpoints, derived at the endpoints using keying material transported to the endpoints, or exchanged between the endpoints.

At 212, the trunking controller 104 provides, in response to the request, keying material related to the unique first symmetric key over the control channel to the source or destination endpoint or both. The trunking controller, at 214, assigns a traffic channel. In at least one embodiment, the trunking controller implements a public key infrastructure protocol to secure a control channel in order to transport keying material related to the unique first unique symmetric key, so that the first unique symmetric key can be securely delivered to both the source and destination endpoints.

With specific reference to FIG. 1, the method 200 for establishing secure point-to-point communications in a trunked radio network is appreciated. In response to the request by the source endpoint, the trunking controller 104 provides keying material related to the symmetric key over the secure control channel to at least one of the source or destination endpoints (212). The keying material relating to the unique first symmetric key refers in some embodiments to include the unique first symmetric key, in other embodiments the keying material (e.g. such as a public key) is used to encrypt the unique first symmetric key and in yet further embodiments the keying material is used to generate the unique first symmetric key.

Asymmetric cryptography involves the use of a unique key pair (i.e. a public and private key pair) between endpoints to secure communications between those endpoints. Each subscriber is associated with a corresponding key pair that is particular to that unit. As mentioned above, every unique key pair includes a public key that is known to other subscribers and a private key that is never disclosed to other subscribers. Accordingly, end-to-end cryptographic operations require either the source endpoint encrypting with the destination endpoint's public key and the destination endpoint decrypting with its private key; or the source endpoint encrypting with its private key and the destination endpoint decrypting with the source endpoint's public key.

Often, a trunking controller keeps track of up to several thousand keys associated with a large talk group that often requires greater overhead for operation with respect to bandwidth utilization. As such, encrypting a unique symmetric key shared between the source and destination endpoints with keying material for confidential communications, in accordance with the present teachings, typically circumvents the overhead associated with the trunking controller constantly keeping track of individual symmetric keys to ensure confidentiality between two specific endpoints. Moreover, to further conserve bandwidth utilization, the trunking controller forwards a public key that is published in one end device's certificate to another end device that will use that public key. Each endpoint's public key is published in a certificate that often becomes known to the trunking controller. Alternatively, the trunking controller can send the endpoints of the certificate from which to retrieve another endpoint's public key.

Referring to FIG. 1, the trunking controller 104 in some embodiments (see, e.g., FIG. 3) provides keying material (212) comprising a public key of the source endpoint to the destination endpoint for use in encrypting the unique first symmetric key to generate an encrypted unique first symmetric key. In one embodiment, the trunking controller 104 receives the encrypted unique first symmetric key from the destination endpoint over the secure control channel and provides the encrypted unique first symmetric key to the source endpoint over the secure control channel. A point-to-point call session is thus established on the assigned traffic channel as the encrypted unique first symmetric key is decrypted by the source endpoint using its private key such that the unique first symmetric key is shared only between the source and destination endpoint during the call session (216).

Alternatively, the trunking controller 104 provides the encrypted unique first symmetric key to the source endpoint over the secure control channel (214) to, along with the public key, establish secure point-to-point communications between the source and destination endpoints. In one embodiment, however, the trunking controller 104 does not provide the encrypted unique first symmetric key, but the destination endpoint provides the encrypted unique first symmetric key directly to the source endpoint over the assigned traffic channel (see, e.g., FIG. 4). The trunking controller 104 in a further embodiment generates the unique first symmetric key and provides the unique first symmetric key as the keying material to both the source and destination endpoints over the secure control channel (see, e.g., FIG. 5).

Optionally, in one embodiment, the trunking controller 104 generates the encrypted unique first symmetric key. Specifically, responsive to the source endpoint request for a traffic channel (210), the trunking controller 104 validates the corresponding public key certificates of the source and destination endpoints before providing keying material related to the unique symmetric key over the secure control channel. In one embodiment, the keying material comprises a public key certificate that includes the public key of the source endpoint provided by the trunking controller 104 to the destination endpoint for use in encrypting the unique first symmetric key to generate an encrypted unique first symmetric key (216) (see, e.g., FIGS. 3 and 4).

In some embodiments, the trunking controller 104 validates a public key certificate provided by the source endpoint that includes an authenticator and a public key certificate provided by the destination endpoint that optionally includes another authenticator. Those of ordinary skill in the art will readily recognize a variety of source authenticators such as, among others, a message authorization code, "MAC" and a cryptographic nonce. Illustratively, in one embodiment, the trunking controller 104 validates a public key certificate provided by the source endpoint that includes a first nonce and a public key certificate provided by the destination endpoint that includes a second nonce. Optionally, as an added encryption measure, the second nonce may include information based on the first nonce.

In one further alternative (see, e.g., FIG. 6), the trunking controller 104 generates a unique symmetric key and then encrypts the unique symmetric key with a unique second symmetric key shared between the trunking controller 104 and the source endpoint to generate an encrypted unique first symmetric key. The unique first symmetric key is encrypted with a unique third symmetric key shared between the trunking controller and the destination endpoint to generate a ticket to the destination endpoint. The ticket authenticates the destination endpoint and, along with first unique symmetric key, establishes a secure point-to-point communication session with the source endpoint. As such, the trunking controller 104 provides the encrypted first unique symmetric key and the ticket to the source endpoint (216).

In one embodiment (see, e.g., FIG. 6), the trunking controller 104 provides the ticket to the source destination over the secure control channel, and the ticket is further provided over the assigned traffic channel. For example, the ticket to the destination endpoint is provided by the source endpoint to the destination endpoint over the assigned traffic channel. In one further embodiment, the trunking controller 104 provides, over the secure control channel, the unique encrypted first symmetric key and the ticket to the destination endpoint as keying material to the source endpoint. In general, a ticket may be provided by a trunking controller along with an encrypted unique first symmetric key to the destination endpoint as keying material to the source endpoint over a network that is readily recognizable by those of ordinary skill in the art, such as, among other, over a nodal network via Kerberos protocol.

Generally speaking, each of the embodiments discussed above describes various combinations by which to securely provide the encrypted unique first symmetric key to the source and destination endpoints to establish secure point-to-point communications between the endpoints. Furthermore, the variations described above discuss when to provide the shared keys, as well as where. For example, some combinations provide the unique first symmetric key over the control channel whereas others provide the unique first symmetric key over the traffic channel. Specific examples of these variations are shown in FIGS. 3-6. In each of the four embodiments shown in FIGS. 3-6, it is assumed that the messaging sent between a source endpoint (subscriber unit) and a destination endpoint (subscriber unit) with a RFSS controller as an intermediary device occurs on a secure control channel, which is secured by any means as described above. Whereas, messaging between the source endpoint and the destination endpoint without the RFSS controller as the intermediary device occurs on a traffic channel (also referred to as bearer traffic).

Figure 3:
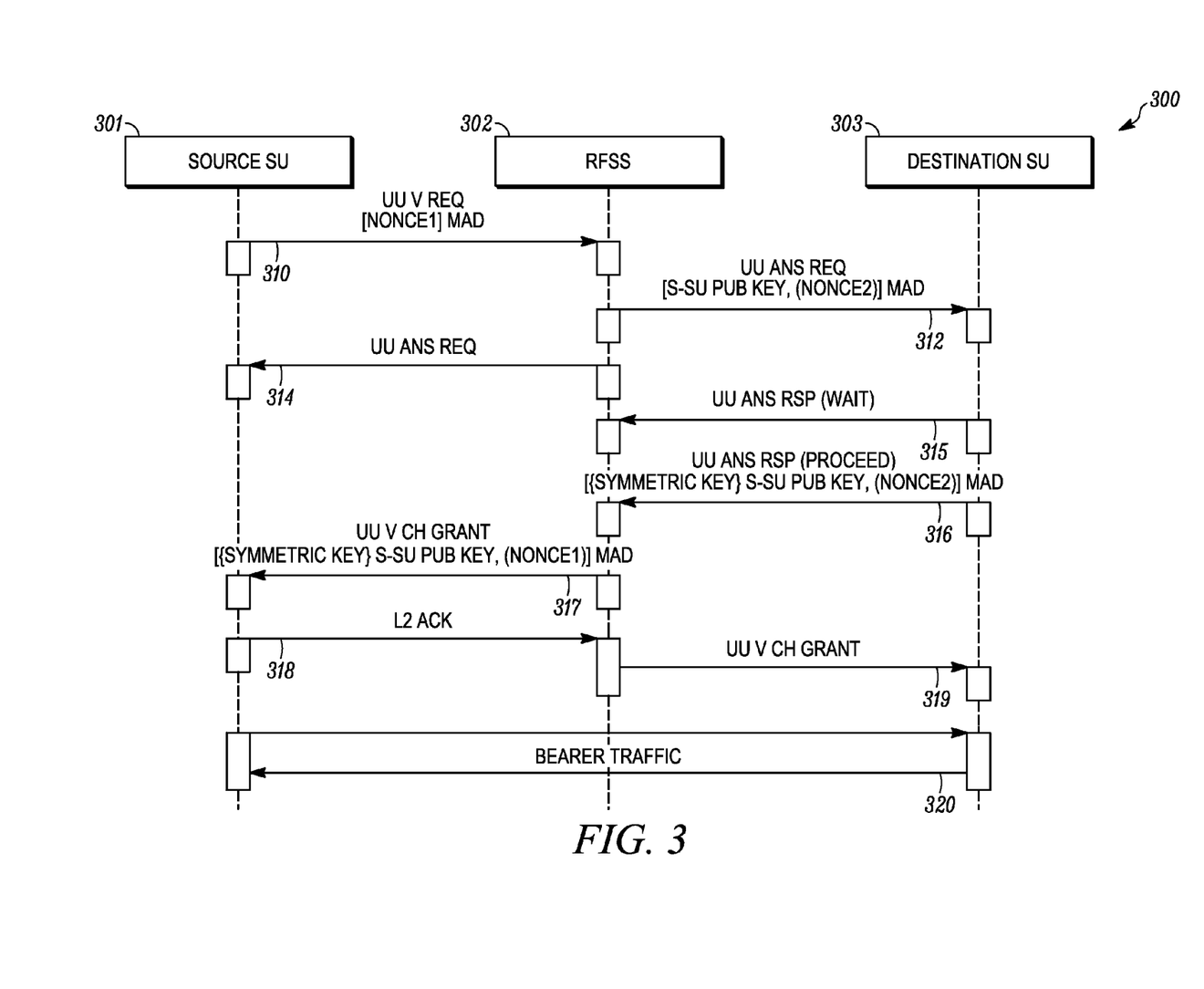
FIG. 3 is a sequence diagram showing an illustrative method for establishing secure point-to-point communications with a call setup using both a unique first symmetric key and a public key in the control channel.

FIG. 3 illustrates a message sequence diagram 300 in accordance with an embodiment of the present disclosure. This embodiment uses a transitive trust relationship between a source subscriber unit (SU) 301, also referred to herein as a S-SU, a destination SU 303, also referred to herein as a D-SU, and a RFSS controller 302 (also referred to simply as the RFSS) to enable the destination SU 303 to communicate a shared secret (i.e., a unique symmetric key) to the source SU 301, by obtaining the source SU's public key or public key certificate from the RFSS 302.

The S-SU 301 begins by sending a UU V REQ 310 (i.e., a request for a traffic channel) to the RFSS 302, to establish a private call with the D-SU 303. The UU V REQ 310 is extended to carry a nonce (i.e., Nonce 1). The RFSS 302, upon receiving the UU V REQ 310 from the S-SU 301, responds to the S-SU 301 with a UU ANS REQ 314, obtains a public key certificate of the S-SU 301 from a certificate repository, if necessary validates the certificate, and embeds the public key of the S-SU 301 in a UU ANS REQ 312 that it sends to the D-SU 303. The D-SU 303 responds with a UU ANS RSP (WAIT) 315. The message 312 also contains a nonce (i.e., Nonce2). This could be the same as Nonce1 received from the S-SU 301 or could be a nonce generated by the RFSS. In this embodiment, the public key of the S-SU 301 serves as the keying material that the RFSS 302 provides to the D-SU 303. The D-SU 303 can trust the public key received by the RFSS 302 because the message 312 was received over the secure control channel and is protected by MAD.

The D-SU 303 generates a unique symmetric key, and sends it, in a UU ANS RSP (Proceed) message 316, to the S-SU at 317 (via the RFSS 302). Message 316 is protected with the public key of the S-SU 301, which the D-SU 303 learned from the RFSS 302. The D-SU 303 also includes the Nonce 2 received from the RFSS 302 message 312 so that the RFSS 302 knows that the message 316 is not a reply attack, and the message 316 is also protected by MAD.

The RFSS 302 sends a UU V CH GRANT 317 to the S-SU 301 with the protected symmetric key sent by the D-SU 316 and with the Nonce1 embedded in the UU V CH GRANT for replay protection. Because the received nonce (i.e., Nonce1) is equal to the original nonce in the UU V Req message 310, the S-SU 301 knows that this UU V CH GRANT 317 is the valid response to the most recent UU V Req message, rather then a replay of an earlier UU V CH GRANT. The final signaling includes the S-SU 301 sending a L2 ACK in response to the UU V CH GRANT 317, and the RFSS 302 sending a UU V CH GRANT 319 to the D-SU 303. In an embodiment, the RFSS 302 uses the UU V CH GRANT message t inform the SUs 301 and 303 of a traffic (bearer) channel 320 assigned by the RFSS 302 in response to the request for a call. The private call conversation (i.e. bearer traffic 320) can now proceed over the bearer channel using the unique symmetric key.

Figure 4:
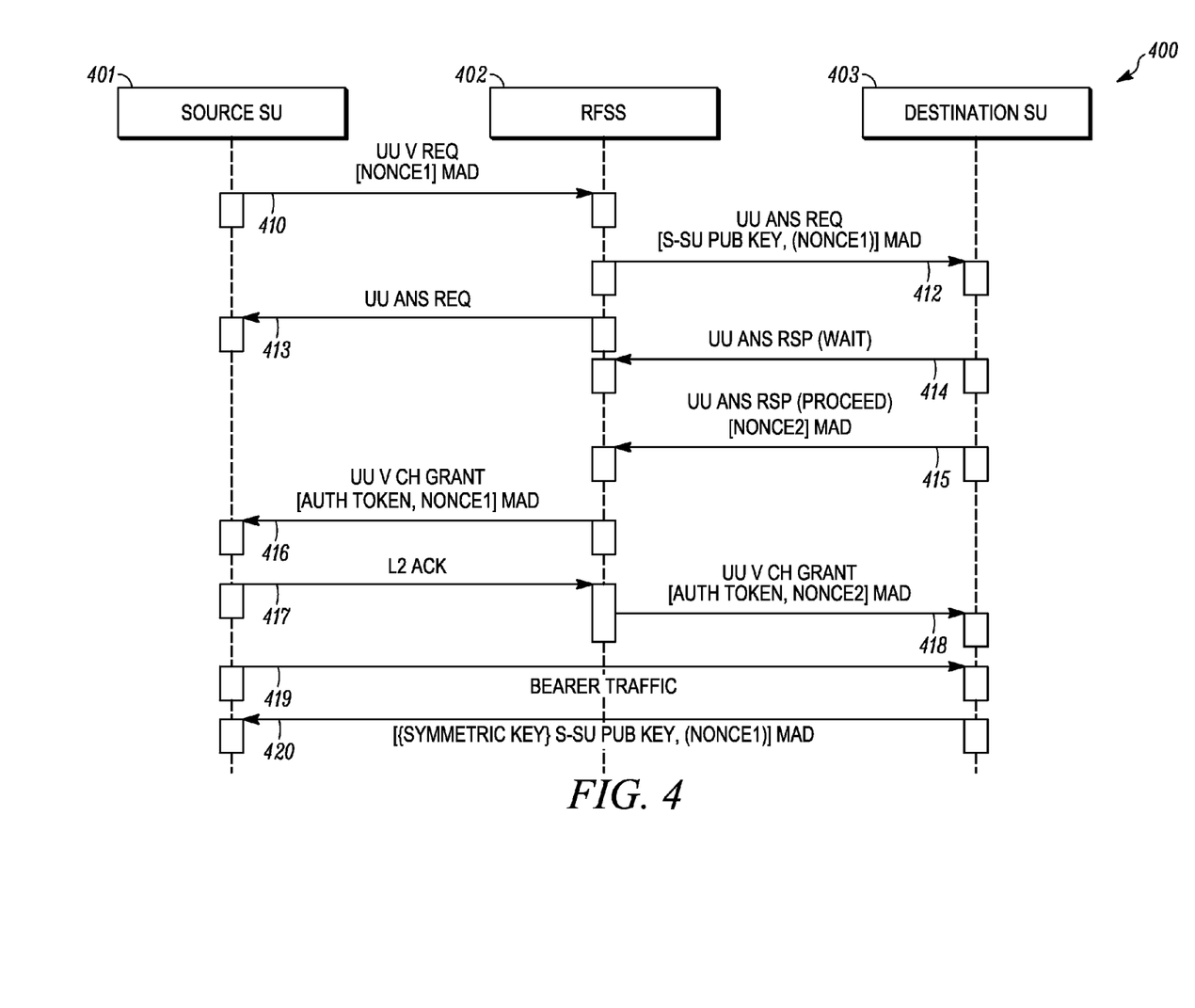
FIG. 4 is a sequence diagram showing an illustrative method for establishing secure point-to-point communications with a call setup using a unique first symmetric key in the traffic channel and a public key in the control channel.

FIG. 4 illustrates a message sequence diagram 400 in accordance with an embodiment of the present disclosure. This embodiment also uses a transitive trust relationship between a source SU 401, a destination SU 403, and a RFSS controller 402 to enable the destination SU 303 to communicate a shared secret (i.e., a unique symmetric key) directly to the source SU 401 over an assigned traffic channel, by obtaining the source SU's public key or public key certificate from the RFSS 402. This embodiment is similar to the embodiment with respect to FIG. 3, except that the step of passing the symmetric key (encrypted by the S-SU's public key) is performed after both the S-SU 401 and D-SU 403 have moved to an assigned traffic channel 419. Accordingly, this embodiment conserves control channel resources.

The S-SU 401 begins by sending a UU V REQ 410 (i.e., a request for a traffic channel) to the RFSS 402, to establish a private call with the D-SU 403. The UU V REQ 410 is extended to carry a nonce (i.e., Nonce 1). The RFSS 402, upon receiving the UU V REQ 410 from the S-SU 401, responds to the S-SU 401 with a UU ANS REQ 413, obtains a public key certificate of the S-SU 401 from a certificate repository, if necessary validates the certificate, and embeds the public key of the S-SU 401 in a UU ANS REQ 412 that it sends to the D-SU 403. The D-SU 403 responds with a UU ANS RSP (WAIT) 414. The message 412 also contains a nonce (i.e., Nonce2). This could be the same as Nonce1 received from the S-SU 401 or could be a nonce generated by the RFSS. In this embodiment, the public key of the S-SU 401 serves as the keying material that the RFSS 402 provides to the D-SU 403. The D-SU 403 can trust the public key received by the RFSS 402 because the message 412 was received over the secure control channel and is protected by MAD.

The D-SU 403 sends a UU ANS RSP (PROCEED) 415 to the RFSS 402 containing another nonce, shown as Nonce2 in FIG. 3 for replay protection, and message 415 is also protected by MAD. Once the D-SU 403 sends the UU ANS RSP 415 to the RFSS 402, the RFSS 302 sends a UU V CH Grant 416 to the S-SU 401 to trigger it to move from the control channel to a traffic channel 419 assigned by the RFSS 402. Message 416 contains Nonce1, which was generate by the S-SU 401 and sent in message 410. S-SU 401 knows that the message 416 is a valid CH Grant and not a replay of a previous Grant message since Nonce1 in messages 410 and 416 are the same. In one embodiment message 416 also contains an authentication token.

The RFSS 402 also sends a UU V CH Grant 418 to the D-SU 403 containing Nonce2 for replay protection, and message 418 is protected by MAD. In one embodiment message 418 may also contain an authentication token. To avoid race conditions, the UU V CH Grant 418 can be delayed until an L2 ACK 417 from the S-SU 401 is received in response to the RFSS to S-SU Grant message 416. Once the S-SU 401 and D-SU 403 have switched to the assigned traffic channel 419, the D-SU 403 generates a unique symmetric key, and sends it to the S-SU 401 protected with the public key of the S-SU (which it learned from the RFSS 401) in a message 420. Message 420 also optionally contains the Nonce 1 so the S-SU 401 can be sure the D-SU 401 is actually sourcing this message and also contains MAD. The private call conversation can now proceed using the unique symmetric key known only to the two SUs 401 and 403.

In one embodiment, the authentication token sent by the RFSS 402 to the S-SU 401 and the D-SU 403 is a symmetric key (or shared secret) which can be used to provide additional protection for the traffic encryption key (i.e., the unique symmetric key between SUs 401 and 403) being transmitted in the traffic channel. In another embodiment the authentication token sent by the RFSS 402 to the S-SU 401 includes the public key of the D-SU 403. In this embodiment the D-SU 403 further signs the traffic encryption key (i.e., the unique symmetric key) with its private key before transmitting (420) it across the bearer channel 419. The S-SU 401 subsequently uses the D-SU's public key received in the authentication token to verify this signature. Also, in one illustrative implementation, the MAD computed on the control channel messages between the S-SU 401 and the RFSS 402 uses a different keying material than the MAD computed on control messages between the RFSS 402 and the D-SU 403, and the MAD computed on the message 420 sent on the traffic channel 419 uses the authentication token sent from the RFSS 402.

Figure 5:
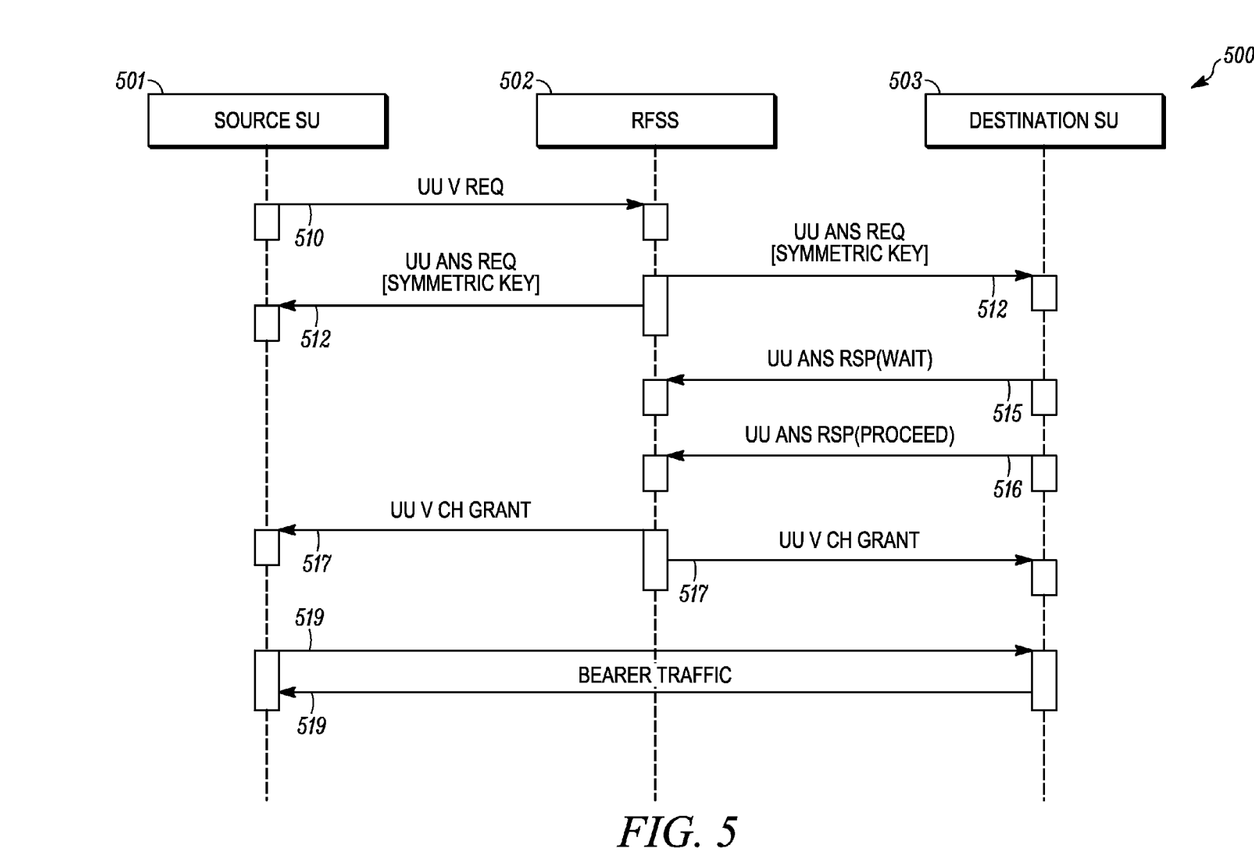
FIG. 5 is a sequence diagram showing an illustrative method for establishing secure point-to-point communications with a call setup using a unique first symmetric key in the control channel as keying material to both source and destination endpoints.

FIG. 5 illustrates a message sequence diagram 500 in accordance with an embodiment of the present disclosure. The S-SU 501 begins by sending a UU V REQ 510 (i.e., a request for a traffic channel) to the RFSS 502, to establish a private call with the D-SU 503. The RFSS 502 validates the service request, and then proceeds to set up resources for the call. The RFSS 502 sends a service answer request (UU ANS REQ) to both the S-SU (at 512) and the D-SU (at 512). The service answer request includes keying material. In one embodiment, the keying material is a unique symmetric key, which can be transported since the control channel is secure. For example, the keying material is a random number that the RFSS 502 generates and then allocates for the call. The same random number is sent by the RFSS 502 to each SU and is used by each SU as the unique symmetric key. In this embodiment, the keying material may be further protected via a unique Key Encryption key shared between the RFSS 501 and both SUs 501 and 503.

In another embodiment the keying material may include the public parameters for key derivation functions such as the Diffie Hellman function. In this embodiment, the RFSS 502 obtains the S-SU's public parameters (i.e., public key or certificate) and forwards them to the D-SU 503, and the RFSS 502 obtains the D-SUs public parameters and forwards them to the S-SU 501. In this way the S-SU 501 and the D-SU 503 can perform a public key based key agreement algorithm to each obtain the same unique symmetric key.

The D-SU 503 acknowledges the service answer request 512 by sending an answer response message 515 (i.e., UU ANS RSP) to the RFSS, with reason code "WAIT". The D-SU 503 may begin ringing at this point. Once the user of the D-SU 503 answers the call, the radio will send an answer response message 516 with reason code "PROCEED" to the RFSS 502. The RFSS 502 sends a service grant message 517 (i.e., UU V CH) to both the S-SU 501 and the D-SU 503. Upon receiving the service grant message 517, each radio move to an assigned traffic channel 519.

Communication between both radios 501, 503 takes place on the traffic channel 519. In one embodiment, the information is encrypted with a unique symmetric key established and sent in messages 512. In another embodiment, the keying material sent to each SU is used to create MAD for traffic on the traffic channel 519. In this embodiment, the initial messages transmitted over the traffic channel 519 may not be confidential; however they would be integrity protected. In this embodiment, the SUs 501 and 503 exchange public parameters for key derivation functions (such as the Diffie Hellman function) over the traffic channel 519, and derive the unique symmetric key from these parameters. All subsequent traffic on the channel 519 is protected using the unique symmetric key.

Figure 6:
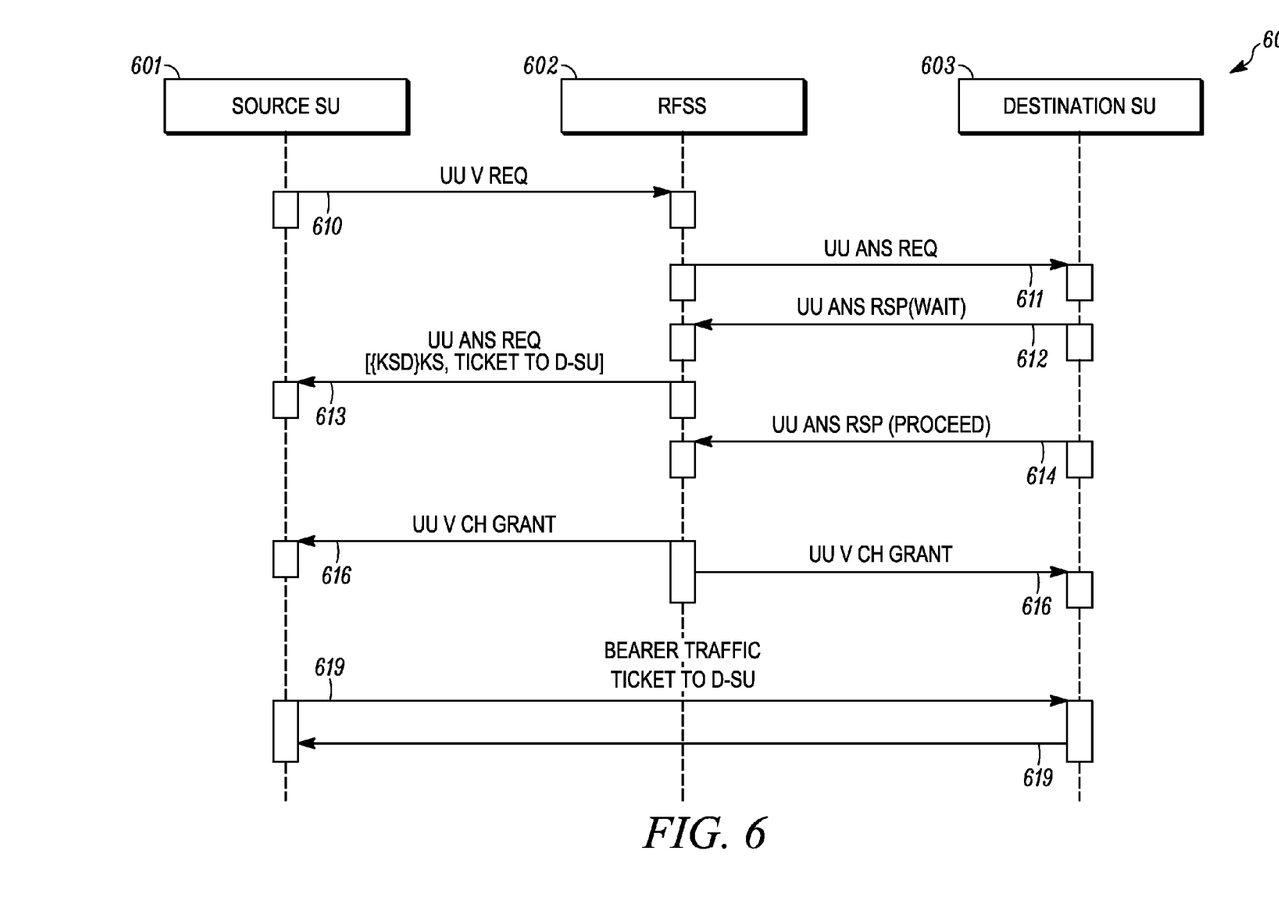
FIG. 6 is a sequence diagram showing an illustrative method for establishing secure point-to-point communications with a call setup using a unique first symmetric key and a ticket to the destination in point over the control channel as keying material to the source endpoint.

FIG. 6 illustrates a message sequence diagram 600 in accordance with an embodiment of the present disclosure. The S-SU 601 begins by sending a UU V REQ 610 (i.e., a request for a traffic channel) to the RFSS 602, to establish a private call with the D-SU 603. The RFSS 602 sends a service answer request 611 (i.e., UU ANS REQ). The D-SU 603 acknowledges the service answer request 611 by sending an answer response message 612 (i.e., UU ANS RSP (WAIT)) to the RFSS 602. On receiving the UU ANS RSP 612 from the D-SU 603, the RFSS 602 generates a unique symmetric key (i.e., Ksd) for use between the S-SU 601 and the D-SU 603 and sends it to the S-SU 601 encrypted with a unique key (i.e., Ks) shared between the RFSS 602 and the S-SU 601. The RFSS 602 also encrypts a copy of Ksd with a unique key (i.e., Kd) shared between the D-SU 603 and the RFSS 602. This is depicted as 'Ticket to D-SU' in FIG. 6. Ksd encrypted with Ks and the 'Ticket to D-SU' are piggybacked on to a UU ANS REQ 613 sent by the RFSS 602 to the S-SU 601.

The D-SU 603 sends to the RFSS 602 a UU ANS RSP (PROCEED) message 614, and the RFSS 602 sends a UU V CH GRANT message 616 to both the S-SU 601 and the D-SU 603. After the S-SU 601 receives the UU CH GRANT message 616 from the RFSS 616 and moves on to an assigned traffic channel 619, the S-SU 601 sends the Ticket to D-SU to the D-SU 603. The D-SU 603 decrypts the 'Ticket to D-SU' and extracts Ksd. S-SU 601 and D-SU 603 can now communicate over the traffic channel 619 using the Ksd to encrypt traffic.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for establishing secure point-to-point communications, the method comprising:
   a controller, laying between a source and a destination endpoint, for assigning radio traffic channels to endpoint devices that communicate via a trunked radio system, performing:
      receiving, from the source endpoint over a secure control channel, a request for a traffic channel for confidential communications between the source endpoint and the destination endpoint, wherein a unique first symmetric key shared between the source and destination endpoints is used for the confidential communications;
      responsive to the request, obtaining a source public key certificate from a certificate repository and validating the source public key certificate;
      responsive to the request, providing a public key of the source over the secure control channel to the destination endpoint to enable securely transmitting a first symmetric key between the destination and the source;
      responsive to the request, assigning the traffic channel;
      receiving from the destination endpoint over the secure control channel the unique first symmetric key encrypted with the source public key; and
      providing to the source endpoint over the secure control channel the encrypted unique first symmetric key.

2. The method of claim 1, wherein the encrypted unique first symmetric key is provided over the assigned traffic channel.

3. The method of claim 2, wherein the encrypted unique first symmetric key is provided between the destination endpoint and the source endpoint over the assigned traffic channel.

4. The method of claim 1 further comprising the controller:
   receiving a first nonce from the source endpoint within the request for the traffic channel,
   forwarding the first nonce to the destination endpoint;
   forwarding the first nonce to the source endpoint in a response message to the request for the traffic channel.

5. The method of claim 1 further comprising the controller informing the source and destination endpoints of the assigned traffic channel.

6. The method of claim 1, wherein the controller provides the encrypted unique first symmetric key to the destination endpoint as the keying material to the source endpoint.

7. A method for establishing secure point-to-point communications, the method comprising:
   sending by a source subscriber, a request to a controller to establish a private call with a destination subscriber;
   upon receiving the request, the controller obtaining a public key certificate of the source subscriber and validating a certificate;
   embedding by the controller, a public key of the source subscriber in to a message;
   sending by the controller, the message to the destination subscriber;
   determining, by the destination subscriber that it can trust the public key received from the controller;
   generating by the destination subscriber, a unique symmetric key;
   sending by the destination subscriber, a response message protected with the public key of the source subscriber; and
   receiving the message by the controller and the controller sending a Channel Grant message to the source subscriber with the protected symmetric key sent by the destination subscriber.

* * * * *

UNITED STATES PATENT AND TRADEMARK OFFICE
CERTIFICATE OF CORRECTION

PATENT NO. : 8,724,812 B2  
APPLICATION NO. : 12/983067  
DATED : May 13, 2014  
INVENTOR(S) : Thomas J. Senese et al.

It is certified that error appears in the above-identified patent and that said Letters Patent is hereby corrected as shown below:

In the specification

In Column 4, Line 57, delete "a information" and insert -- an information --, therefor.

In Column 13, Line 10, delete "D-SU 316" and insert -- D-SU 303 --, therefor.

In Column 13, Lines 15-16, delete "rather then" and insert -- rather than --, therefor.

In Column 14, Line 14, delete "RFSS 401)" and insert -- RFSS 402) --, therefor.

In Column 15, Line 45, delete "UU CH GRANT" and insert -- UU V CH GRANT --, therefor.

In Column 15, Line 46, delete "RFSS 616" and insert -- RFSS 602 --, therefor.

Signed and Sealed this
Fifth Day of April, 2016

Michelle K. Lee
*Director of the United States Patent and Trademark Office*